US007454903B2

(12) United States Patent
Matsumoto et al.

(10) Patent No.: US 7,454,903 B2

(45) Date of Patent: Nov. 25, 2008

(54) AIR SERVO CYLINDER

(75) Inventors: Daisuke Matsumoto, Tsukuba-gun (JP); Nobuhiro Fujiwara, Tsukuba-gun (JP); Hiroshi Miyachi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 596 days.

(21) Appl. No.: 11/078,304

(22) Filed: Mar. 14, 2005

(65) Prior Publication Data

US 2005/0229593 A1 Oct. 20, 2005

(30) Foreign Application Priority Data

Mar. 30, 2004 (JP) ............................ 2004-100816

(51) Int. Cl.
*F16D 31/02* (2006.01)

(52) U.S. Cl. .......................................... 60/407; 60/469

(58) Field of Classification Search .................. 60/407, 60/469; 91/1, 465; 181/230, 239, 256

See application file for complete search history.

(56) References Cited

U.S. PATENT DOCUMENTS

| | | | | |
|---|---|---|---|---|
| 4,565,259 | A * | 1/1986 | Stoll | 181/230 |
| 4,651,625 | A * | 3/1987 | Hoge | 91/465 |
| 5,097,924 | A * | 3/1992 | Reeves | 181/230 |
| 7,062,832 | B2 * | 6/2006 | Yo et al. | 29/407.08 |

FOREIGN PATENT DOCUMENTS

| | | | |
|---|---|---|---|
| DE | 33 26 802 | C2 | 2/1985 |
| DE | 34 27 589 | A1 | 2/1986 |
| DE | G 92 15 263.5 | | 2/1993 |
| DE | 195 10 859 | C1 | 8/1996 |
| DE | 199 32 358 | C2 | 2/2001 |
| EP | 0 962 663 | B1 | 4/2004 |
| JP | 3088440 | | 7/2000 |

* cited by examiner

*Primary Examiner*—Michael Leslie
(74) *Attorney, Agent, or Firm*—Oblon, Spivak, McClelland, Maier & Neustadt, P.C.

(57) ABSTRACT

In an air servo cylinder formed by integrally combining an air cylinder, servo valves, and a controller via a manifold block, there are provided, in the manifold block, air discharge flow paths for releasing, to the outside, compressed air discharged associated with operations of the servo valves. In each of the air discharge flow paths, a silencer for reducing exhaust noise is incorporated so as not to protrude from the manifold block to the outside.

13 Claims, 3 Drawing Sheets

AIR SERVO CYLINDER

TECHNICAL FIELD

The present invention relates to an air servo cylinder formed by integrally assembling an air cylinder and servo valves for controlling thereof, and more specifically, relates to an air servo cylinder applied to a spot welding gun, and usable for the clamping of workpiece to be welded, or the like.

BACKGROUND ART

A welding gun having a clamp mechanism for clamping workpiece to be welded during spot welding comprises an air servo cylinder formed by integrally assembling an air cylinder with servo valves, a controller for controlling the air cylinder, and the like. This welding gun is mounted on the tip of an arm of a robot for welding, and performs welding operation while being moved to various welding positions. Therefore, the requirements for the welding gun are small size, light weight, and compactness.

Also, it is desirable for the welding gun to be capable of clamping workpiece while being moved in narrow spaces, so that it is necessary to prevent air piping, an electric power supply line, and electric signal lines from becoming obstacles to operations of the welding gun.

In the air servo cylinder, when the servo valves are attached to the air cylinder, each of the discharge flow paths for air discharged from the air cylinder through the servo valve is generally provided with silencers for reducing exhaust noise. Conventionally, however, general-purpose silencers have been used to be installed so as to protrude from the discharge flow paths to the outside. This has increased the possibility of becoming obstacles to operations of the welding gun even if the silencers are small protrusions, since the silencers are attached to the welding gun so as to protrude toward the outside.

Such a problem is not confined to welding guns for spot welding, but generally occurs in various automatic operation apparatus that are attached to the tip of a robot, for working.

In the air servo cylinder, the pressure of each pressure chamber in the air cylinder is detected by a pressure sensor, and based on the detection signals, a control signal is outputted from the controller to each of the servo valves. Usually, the pressure in each of the pressure chambers is detected at a position of the servo valve adjacent to the air cylinder, and introduced into the controller through a signal line passing through the outside of the apparatus. This has caused a problem in that the air servo cylinder is subjected not only to sputtering occurring during welding but also to electromagnetic noises. It has therefore been necessary to provide a cover to the signal lines for avoiding influences of sputtering, and to take countermeasures against a malfunction caused by electromagnetic noises.

DISCLOSURE OF THE INVENTION

The object of the present invention is to reasonably design and configure an air servo cylinder that is formed by integrally assembling servo valves to an air cylinder, and thereby to downsize the air servo cylinder as well as enhance its functionality.

To achieve the above-described object, the present invention provides an air servo cylinder formed by integrally connecting servo valves to an air cylinder with a manifold block therebetween. This air servo cylinder includes flow paths each connecting the air cylinder and a respective one of the servo valves; and air discharge flow paths each releasing, to the outside, compressed air discharged associated with operation of the respective one of the servo valves, the flow paths and the air discharge flow paths being formed within the manifold block. Herein, a silencer for reducing exhaust noise is incorporated into each of the air discharge flow paths so as not to protrude from the manifold block to the outside.

In the present invention, it is preferable that an enlarged-diameter hole having an enlarged diameter be formed at the open end of each of the air discharge flow paths, and that the silencer be incorporated into the enlarged-diameter hole.

Also, in the present invention, the silencer comprises a sound-deadening material constituted of a porous material, and a holder for replaceably holding the sound-deadening material in each of the air discharge flow paths.

Herein, it is preferable that the sound-deadening material has the shape of a cup having an end wall section at one end of a cylinder section thereof; that the sound-deadening material be accommodated in each of the air discharge flow paths with the end wall section thereof faced toward the outside of the air discharge flow path; and that the holder has outflow openings for discharging exhaust that has passed through the sound-deadening material. Furthermore, it is preferable that the holder further includes a lid section for covering the open end of each of the air discharge flow paths, and an accommodating cylinder section having a cylindrical shape, the accommodating cylinder section replaceably accommodating the sound-deadening material.

In the present invention, it is preferable that each of the manifold block and the servo valves have a size falling within the breath of a cylinder tube in the air cylinder, and that the manifold block be mounted on the side surface of the cylinder tube. Herein, each of the servo valves is preferably arranged with the axial line thereof directed to a direction perpendicular to the axis line of the air cylinder.

According to a specific aspect of the present invention, the manifold block is formed of aluminum; a controller for controlling the operation of each of the servo valves is either connected to the manifold block, or disposed adjacently thereto; and the controller and each of the servo valves are interconnected by electric wiring passing through the inside of the manifold block.

Moreover, in the present invention, the above-described air servo cylinder further includes pressure sensors connected to respective pressure chambers in the air cylinder. The pressure sensors are disposed within the manifold block, and a signal line connecting each of the pressure sensors and the controller is inserted through the inside of the manifold block.

BEST MODE FOR CARRYING OUT THE INVENTION

Figure 1:
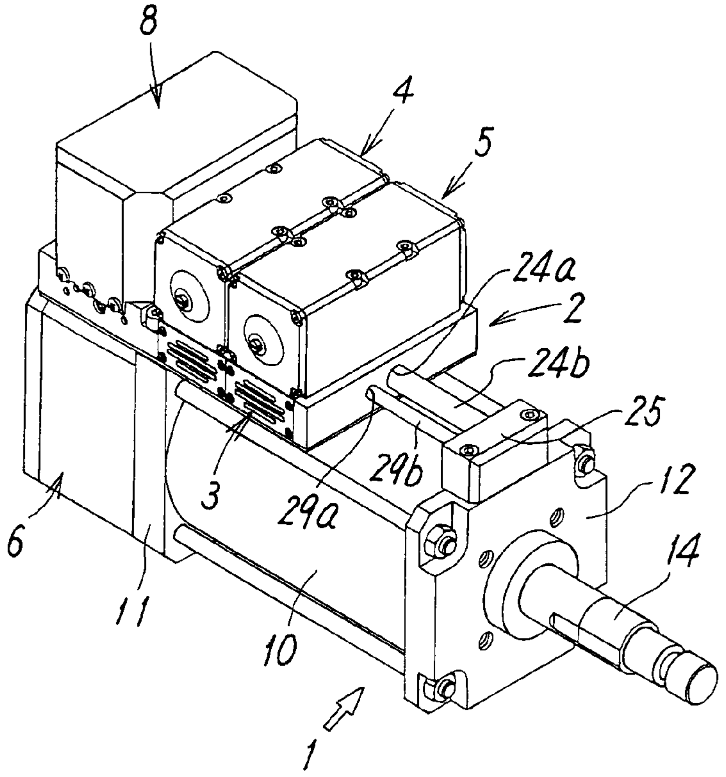
FIG. 1 is a perspective view showing the overall construction of an air servo cylinder according to an embodiment of the present invention, wherein the air servo cylinder is used as a gun for spot welding.
Figure 2:
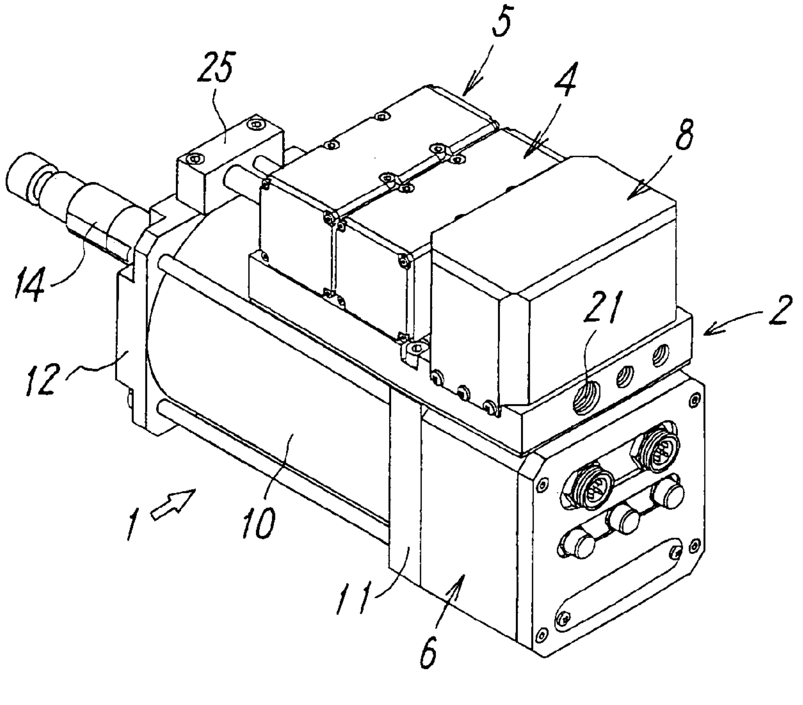
FIG. 2 is a perspective view of the embodiment as viewed from another direction.
Figure 3:
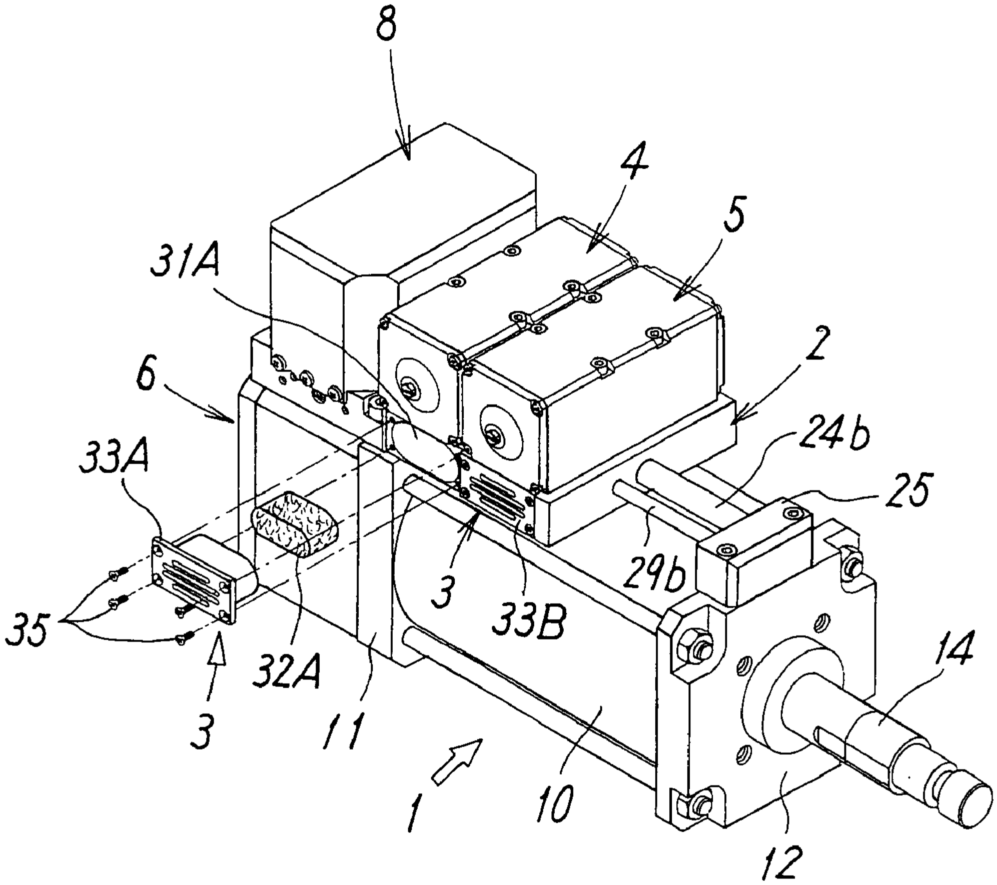
FIG. 3 is a perspective view of the embodiment in FIG. 1, wherein a silencer is shown in a decomposed state.

FIGS. 1 to 3 show external appearances of the air servo cylinder according to the present invention. This air servo cylinder is used as an actuator for driving a clamping mechanism for clamping workpiece to be welded, in a gun for spot welding.

Broadly speaking, the air servo cylinder is configured so that a first and second servo valves 4,5 are mounted on the side surface of the air cylinder 1 with a plate-shaped manifold block 2 therebetween; compressed air supply and discharge flow paths that connect the air cylinder 1 and each of the servo valves 4,5 are formed in the manifold block 2; and the air cylinder 1 is driven by the servo valves 4,5. Furthermore, a silencer 3, to be described later, for reducing exhaust noise is incorporated into the manifold block 2. On the end section of the manifold block 2, a controller 6 is provided on the undersurface thereof while an equalizing unit 8 is mounted on the top surface thereof.

Figure 4:
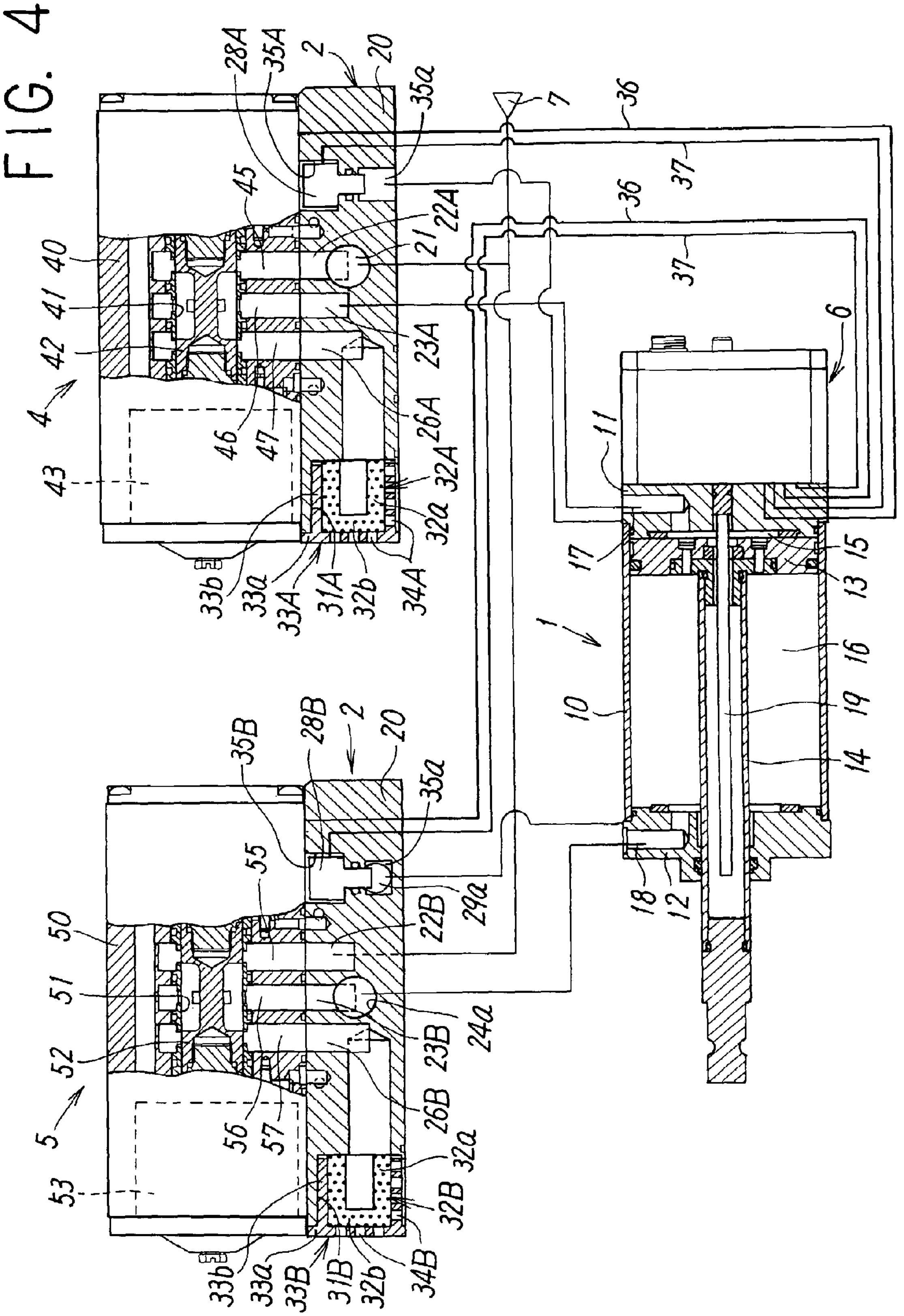
FIG. 4 is a constructional view of the air servo cylinder according to the embodiment, wherein elements constituting the air servo cylinder are illustrated in the form of partial sections.

As shown in FIG. 4, the air cylinder 1 includes a head cover 11 at one end of a cylinder tube 10, and a rod cover 12 at the other end thereof. A hollow piston rod 14 is connected to a piston 13 slidably provided in the cylinder tube 10, and is hermetically led out to the outside through the rod cover 12. Here, the head cover 11 and the rod cover 12, respectively, have a first and second ports 17,18 communicating with pressure chambers 15,16 on the head and rod sides of the piston 13, respectively. These ports 17,18, respectively, are individually connected to the servo valves 4,5, which control the air cylinder 1, through the flow paths in the manifold block 2.

The controller 6 is connected to the head cover 11 in the air cylinder 1. A position sensor 19, which is connected to this controller 6, is inserted through the central hole of the piston rod 14 so as to detect moving positions of the piston 13.

However, the controller 6 may be connected to the manifold block 2 instead of the head cover 11. Alternatively, the controller 6 may also be connected to both the head cover 11 and the manifold block 2.

As shown in FIG. 4, the servo valves 4,5, respectively, include valve members 42,52 slidably provided in valve holes 41,51 in bodies 40,50 of the servo valves 4,5, respectively; a drive mechanism including electromagnetic drive sections 43,53 for driving and returning the valve members 42,52, respectively, and neutral-position return mechanism sections (not shown) for returning the valve members 42,52, respectively, to a neutral position; supply ports 45,55 which are provided in the bodies 40,50, respectively, and to each of which compressed air is supplied from a common air supply source 7 through a supply path 21 in the manifold block 2; output ports 46,56, respectively, supplying and discharging compressed air with respect to the ports 17,18 of the air cylinder 1 associated with the driving of the valve members 42,52 by the drive mechanism; and discharge ports 47,57, respectively, discharging the compressed air from the output ports 46,56 associated with the driving of the valve members 42,52.

The drive mechanism including electromagnetic drive sections 43,53 in the servo valves 4,5 is controlled by the controller 6. Position information detected by the position sensor 19, and pressure information from first and second pressure sensors 28A,28B, disposed in the manifold block 2 and detecting pressures in the pressure chambers 15,16 in the air cylinder 1, respectively, are fed back to the controller 6, or alternatively, the above-described information and a command signal from the outside are sent to the controller 6. Based on these, the controller 6 outputs a control signal to control the valve opening degrees of the valve members 42,52 via the drive means.

The manifold block 2, common to the two servo valves 4,5, has a block body 20. On the block body 20, the servo valves 4,5 are mounted side by side with their axial lines directed to a direction perpendicular to the axial line of the air cylinder 1. In other words, the servo valves 4,5 are mounted with the operational directions of the valve members 42,52 of the servo valves 4,5 directed to a direction perpendicular to the axial line of the piston rod 14. Such a mounting posture of the servo valves 4,5 is effective in preventing the valve members 42,52 from being affected by vibrations associated with the driving of the air cylinder 1. Also, the block body 20 has therein air supply flow paths 22A,22B, respectively, supplying compressed air from the common air supply source 7 to the supply ports 45,55 of the servo valves 4,5 through the supply path 21 (see FIGS. 2 and 4) in the block body 20.

As can be seen from FIGS. 1 and 2, the manifold block 2 has a breadth equal to or less than the diameter of the cylinder tube 10 in the air cylinder 1, and the length in the axial line direction, of each of the servo valves 4,5 to be mounted on the manifold block 2, is also made a length falling within the breadth of the manifold block 2. Also, the equalizing unit 8 and the controller 6 are formed to similar sizes.

A material to be used for the manifold block 2 is not limited as long as it is a rigid material having a required mechanical strength, heat resistance, and the like. Preferably, it is formed of a material capable of exerting a magnetic shielding effect, and more preferably, it is formed of a paramagnetic or diamagnetic conductive metallic material, such as aluminum or copper, less prone to being magnetized by an external magnetic field, so as to effectively shield against high-frequency noises occurring during welding.

The block body 20 includes an air output flow path 23A that outputs compressed air sent out from the output port 46 associated with operation of the valve member 42 of the first servo valve 4 to the first port 17 in the air cylinder 1; and an air output flow path 23B that outputs compressed air sent out from the output port 56 associated with operation of the valve member 52 of the second servo valve 5 to the second port 18 in the air cylinder 1. Here, the air output flow path 23A directly communicates with the first port 17 through no intermediary of external piping. On the other hand, the air output flow path 23B communicates with the second port 18 in the air cylinder 1, through a pipe 24*b* extending along the outer surface of the cylinder tube 10 from a cave hole 24*a* (see FIG. 4) that opens in an end face of the block body 20, a flow path within a piping block 25 (see FIGS. 1 and 3) to which the end of the pipe 24*b* is connected, and a flow path within the rod cover 12 to which the piping block 25 is attached.

Furthermore, the block body 20 includes air discharge flow paths 26A,26B, respectively, communicating with the discharge ports 47,57 in the servo valves 4,5. The air discharge flow paths 26A,26B are arranged to discharge compressed air associated with changeover operation of the valve members 42,52 of the servo valves 4,5. The discharge flow paths 26A, 26B, respectively, once extend downward from the top surface of the block body 20 inside the block body 20, and then, after having turned in the direction in parallel with the axial lines of the servo valves 4,5 (i.e., in the left direction in FIG. 4), they open at positions of a side end face of the block body 20, corresponding to the servo valves 4,5.

The open ends of the air discharge flow paths 26A,26B form enlarged-diameter holes 31A,31B each having an enlarged diameter, and the silencer 3 is incorporated into each of the enlarged-diameter holes 31A,31B. The silencer 3 comprises sound-deadening materials 32A,32B each constituted of a porous material, and holders 33A,33B for holding these sound-deadening materials 32A,32B, respectively. The silencers 3 are accommodated in the respective enlarged-diameter holes 31A,31B so as not to protrude from the block body 20 to the outside.

Here, more specific descriptions of the enlarged-diameter holes 31A,31B, and the silencers 3 will be provided below.

As illustrated in detail in FIGS. 3 and 4, each of the enlarged-diameter holes 31A,31B has a horizontally oriented oval shape, and is opened from an end face of the block body 20 not only toward the side of the block body 20, but also toward undersurface side thereof. That is, out of porous walls surrounding the enlarged-diameter holes 31A,31B, porous walls on the lower sides, i.e., on the air cylinder 1 side, are opened.

Each of the sound-deadening materials 32A,32B for the silencers 3 is formed into the shape of a cup constituted of a cylinder section 32*a* having a horizontally oriented oval shape, and an end wall section 32*b* for blocking one end of the cylinder section 32*a*. On the other hand, the holders 33A,33B comprise rectangular lid sections 33*a* for blocking the ends of the enlarged-diameter holes 31A,31B, and accommodating cylinder sections 33*b* each having a cylindrical shape with a horizontally oriented oval cross section and extending from the rear surface of the lid section 33*a*. In the accommodating cylinder sections 33*b*, the sound-deadening materials 32A, 32B are replaceably accommodated with the end wall sections 32*b* thereof directed toward the lid section 33*a* side, i.e., toward the outside of the air discharge flow paths. By accommodating the accommodating cylinder sections 33*b* in the respective enlarged-diameter holes 31A,31B, and fixing the lid sections 33*a* to the end face of the block body 20 with screws 35, the silencers 3 are removably attached in the respective enlarged-diameter holes 31A,31B. Outflow openings 34A,34B, respectively, allowing exhaust discharged through the sound-deadening materials 32A,32B to flow out to the outside are provided to the respective lid sections 33*a*. Other outflow openings 34A and 34B that are the same as the foregoing, are also provided in the lower walls of the respective accommodating cylinder sections 33*b* so as to open toward the undersurface side of the block body 20.

The above-described installation structure of the silencers 3 prevents the silencers 3 from largely protruding from the apparatus toward the outside, thereby offering a significant advantage in the size-reduction of the apparatus.

In the illustrated example, the sound-deadening material 32A,32B has the shape of a hollow cup. However, the shapes thereof are not limited to such a form, but may include a solid cylindrical shape or a plate shape. Also, each of the holder 33A,33B may be constituted of the lid section 33*a* alone without having the accommodating cylinder section 33*b*. In effect, the holders 33A,33B are not limited as long as they can replaceably hold the sound-deadening material 32A,32B in the enlarged-diameter holes 31A,31B, respectively.

Within the block body 20, there are provided a first and second sensor chambers 35A,35B individually communicating with the pair of pressure chambers 15,16 in the air cylinder 1, respectively, and the first and second pressure sensors 28A,28B are accommodated in these sensor chambers 35A, 35B, respectively.

The first sensor chamber 35A accommodating the first pressure sensor 28A directly communicates with the pressure chamber 15 on the head side from a communicating path 35*a* in the block body 20 through a through hole in the head cover 11, through no intermediary of external piping. On the other hand, the second sensor chamber 35B accommodating the second pressure sensor 28B communicates with the pressure chamber 16 on the rod side in the air cylinder 1 from the communicating path 35*a* in the block body 20 through a cave hole 29*a* (see FIG. 4) opening in the end face of the block body 20, a pipe 29*b* one end of which is connected to the cave hole 29*a* and which extends along the outer surface of the cylinder tube 10, a flow path in the piping block 25 (see FIGS. 1 and 3) to which the other end of the pipe 29*b* is connected, and a flow path in the rod cover 12 to which the piping block 25 is attached. Here, the first and second sensor chambers 35A,35B may also be connected to the ports 17,18, respectively.

The two servo valves 4,5, and the two pressure sensors 28A,28B, respectively, are electrically connected to the controller 6 through conductors 36 and signal lines 37 inserted through the inside of the block body 20. After having past through the inside of the block body 20, the aforementioned electric wiring 36,37 are connected to a wiring board inside the controller 6, through the inside of the head cover 11.

As described above, integrally assembling the two servo valves 4,5, and the controller 6 for controlling them around the air cylinder 1 via the block body 20, allows the size-reduction of the apparatus. Combined with such an integral assembling, installing the silencers 3 so as not to protrude toward the outside as described above, produce the effects of further promoting size-reduction and enhancing functionality.

Also, assembling the pressure sensors 28A,28B into the block body 20, and accommodating, within the block body 20, the electric wiring 36,37 for connecting the pressure sensors 28A,28B and the servo valves 4,5 to the controller 6, makes it possible to prevent the electric wiring 36,37 from being affected by sputtering during welding. In addition, forming the manifold block 2 using a paramagnetic or diamagnetic conductive metallic material less prone to being magnetized by an external magnetic field, such as aluminum or copper, enables electromagnetic noises, especially high-frequency noises caused by sparks and the like during welding to be effectively shielded against, thus enhancing electromagnetic shield effect with respect to the pressure sensors 28A,28B, the signal lines therefor, and the like, which are susceptible to high-frequency noises.

Furthermore, in the above-described air servo cylinder, since the manifold block 2 and the servo valves 4,5, as well as controller 6 and equalizing unit 8 are each formed to a size falling within the breadth of the cylinder tube 10 in the air cylinder 1, and they are assembled with the air cylinder 1, the overall size of the apparatus becomes small and compact, thereby providing a significant convenience when being moved in a narrow space while being attached to the tip of a robot arm.

The invention claimed is:

1. An air servo cylinder formed by integrally connecting servo valves to an air cylinder with a manifold block therebetween, the air servo cylinder comprising:

flow paths each connecting the air cylinder and a respective one of the servo valves; and air discharge flow paths each releasing, to the outside, compressed air discharged associated with operation of the respective one of the servo valves, the flow paths and the air discharge flow paths being formed within the manifold block, wherein a silencer for reducing exhaust noise is incorporated into each of the air discharge flow paths so as not to protrude from the manifold block to the outside;

a sound-deadening material constituted of a porous material; and a holder for replaceably holding the sound-deadening material in each of the air discharge flow paths, wherein the sound-deadening material has the shape of a cup having an end wall section at one end of a cylinder section thereof;

wherein the sound-deadening material is accommodated in each of the air discharge flow paths with the end wall section thereof faced toward the outside of the air discharge flow path; and wherein the holder has outflow openings for discharging exhaust that has passed through the sound-deadening material.

2. The air servo cylinder according to claim 1, wherein the holder further comprises:

a lid section for covering the open end of each of the air discharge flow paths; and an accommodating cylinder section having a cylindrical shape, the accommodating cylinder section replaceably accommodating the sound-deadening material.

3. The air servo cylinder according to claim 2, wherein the manifold block is formed of aluminum;

wherein a controller for controlling the operation of each of the servo valves is either connected to the manifold block, or disposed adjacently thereto; and wherein the controller and each of the servo valves are interconnected by electric wiring passing through the inside of the manifold block.

4. The air servo cylinder according to claim 1, wherein the manifold block is formed of aluminum;

wherein a controller for controlling the operation of each of the servo valves is either connected to the manifold block, or disposed adjacently thereto; and wherein the controller and each of the servo valves are interconnected by electric wiring passing through the inside of the manifold block.

5. An air servo cylinder formed by integrally connecting servo valves to an air cylinder with a manifold block therebetween, the air servo cylinder comprising:

flow paths each connecting the air cylinder and a respective one of the servo valves; and air discharge flow paths each releasing, to the outside, compressed air discharged associated with operation of the respective one of the servo valves, the flow paths and the air discharge flow paths being formed within the manifold block, wherein a silencer for reducing exhaust noise is incorporated into each of the air discharge flow paths so as not to protrude from the manifold block to the outside, wherein an enlarged-diameter hole having an enlarged diameter is formed at the open end of each of the air discharge flow paths; and wherein the silencer is incorporated into the enlarged-diameter hole;

a sound-deadening material constituted of a porous material; and a holder for replaceably holding the sound-deadening material in each of the air discharge flow paths, wherein the sound-deadening material has the shape of a cup having an end wall section at one end of a cylinder section thereof;

wherein the sound-deadening material is accommodated in each of the air discharge flow paths with the end wall section thereof faced toward the outside of the air discharge flow path; and wherein the holder has outflow openings for discharging exhaust that has passed through the sound-deadening material.

6. The air servo cylinder according to claim 5, wherein the holder further comprises:

a lid section for covering the open end of each of the air discharge flow paths; and an accommodating cylinder section having a cylindrical shape, the accommodating cylinder section replaceably accommodating the sound-deadening material.

7. An air servo cylinder formed by integrally connecting servo valves to an air cylinder with a manifold block therebetween, the air servo cylinder comprising:

flow paths each connecting the air cylinder and a respective one of the servo valves; and air discharge flow paths each releasing, to the outside, compressed air discharged associated with operation of the respective one of the servo valves, the flow paths and the air discharge flow paths being formed within the manifold block, wherein a silencer for reducing exhaust noise is incorporated into each of the air discharge flow paths so as not to protrude from the manifold block to the outside, wherein the manifold block is formed of aluminum;

wherein a controller for controlling the operation of each of the servo valves is either connected to the manifold block, or disposed adjacently thereto; and wherein the controller and each of the servo valves are interconnected by electric wiring passing through the inside of the manifold block.

8. An air servo cylinder formed by integrally connecting servo valves to an air cylinder with a manifold block therebetween, the air servo cylinder comprising:

flow paths each connecting the air cylinder and a respective one of the servo valves; and air discharge flow paths each releasing, to the outside, compressed air discharged associated with operation of the respective one of the servo valves, the flow paths and the air discharge flow paths being formed within the manifold block, wherein a silencer for reducing exhaust noise is incorporated into each of the air discharge flow paths so as not to protrude from the manifold block to the outside;

a sound-deadening material constituted of a porous material; and a holder for replaceably holding the sound-deadening material in each of the air discharge flow paths, wherein the manifold block is formed of aluminum;

wherein a controller for controlling the operation of each of the servo valves is either connected to the manifold block, or disposed adjacently thereto; and wherein the controller and each of the servo valves are interconnected by electric wiring passing through the inside of the manifold block.

9. An air servo cylinder formed by integrally connecting servo valves to an air cylinder with a manifold block therebetween, the air servo cylinder comprising:

flow paths each connecting the air cylinder and a respective one of the servo valves; and air discharge flow paths each releasing, to the outside, compressed air discharged associated with operation of the respective one of the servo valves, the flow paths and the air discharge flow paths being formed within the manifold block, wherein a silencer for reducing exhaust noise is incorporated into each of the air discharge flow paths so as not to protrude from the manifold block to the outside, wherein the manifold block is formed of aluminum, and a pressure sensor for detecting pressure in a pressure chamber of the air cylinder is attached thereto, the pressure sensor and the servo valves interconnected with the controller by electric wiring passing through the inside of the manifold block.

10. The air servo cylinder according to claim 9, wherein the silencer comprises:

a sound-deadening material constituted of a porous material; and a holder for replaceably holding the sound-deadening material in each of the air discharge flow paths.

11. The air servo cylinder according to claim 9, wherein each of the manifold block and the servo valves has a size falling within the breadth of a cylinder tube in the air cylinder; and wherein the manifold block is mounted on the side surface of the cylinder tube.

12. The air servo cylinder according to claim 11, wherein each of the servo valves is arranged with the operational direction of a valve member thereof directed to a direction perpendicular to a piston rod in the air cylinder.

13. An air servo cylinder formed by integrally connecting servo valves to an air cylinder with a manifold block therebetween, the air servo cylinder comprising:

flow paths each connecting the air cylinder and a respective one of the servo valves; and air discharge flow paths each releasing, to the outside, compressed air discharged associated with operation of the respective one of the servo valves, the flow paths and the air discharge flow paths being formed within the manifold block, wherein a silencer for reducing exhaust noise is incorporated into each of the air discharge flow paths so as not to protrude from the manifold block to the outside, wherein the manifold block is formed of aluminum, and a pressure sensor for detecting pressure in a pressure chamber of the air cylinder is attached thereto, the pressure sensor and the servo valves interconnected with the controller by electric wiring passing through the inside of the manifold block, wherein the silencer comprises:

a sound-deadening material constituted of a porous material; and a holder for replaceably holding the sound-deadening material in each of the air discharge flow paths, wherein the sound-deadening material has the shape of a cup having an end wall section at one end of a cylinder section thereof;

wherein the sound-deadening material is accommodated in each of the air discharge flow paths with the end wall section thereof faced toward the outside of the air discharge flow path, wherein the holder further comprises:

a lid section for covering the open end of each of the air discharge flow paths;

an accommodating cylinder section having a cylindrical shape, the accommodating cylinder section replaceably accommodating the sound-deadening material; and outflow openings for discharging exhaust that has passed through the sound-deadening material.

* * * * *